(12) United States Patent
Thery (10) Patent No.: US 6,931,956 B2
(45) Date of Patent: Aug. 23, 2005

(54) LOCKING DEVICE WITH TRANSMISSION GEARS

(75) Inventor: Pascal Thery, Amiens (FR)

(73) Assignee: Valeo, Paris (FR)

( * ) Notice: Subject to any disclaimer, the term of this patent is extended or adjusted under 35 U.S.C. 154(b) by 169 days.

(21) Appl. No.: 10/343,231

(22) PCT Filed: Jun. 5, 2001

(86) PCT No.: PCT/FR01/01723

§ 371 (c)(1),
(2), (4) Date: Jan. 30, 2003

(87) PCT Pub. No.: WO02/099313

PCT Pub. Date: Dec. 12, 2002

(65) Prior Publication Data

US 2004/0025618 A1 Feb. 12, 2004

(51) Int. Cl.⁷ .............................. F16H 3/08; F16H 3/14; F16D 13/04
(52) U.S. Cl. ............................. 74/325; 74/330; 74/333; 74/337.5; 74/355; 192/41 R
(58) Field of Search ................... 74/325, 330, 333–335, 74/337.5, 355–361; 192/41 R, 41 S, 43–43.1

(56) References Cited

U.S. PATENT DOCUMENTS

| | | | | |
|---|---|---|---|---|
| 2,198,958 A | * | 4/1940 | Cahn ........................... 74/325 |
| 3,275,055 A | * | 9/1966 | Gutshall ...................... 411/134 |
| 3,670,589 A | * | 6/1972 | Carter .......................... 74/325 |
| 5,863,270 A | * | 1/1999 | Chen et al. .................. 475/289 |
| 5,871,071 A | * | 2/1999 | Sink ............................. 192/46 |
| 5,975,266 A | * | 11/1999 | Balhorn ....................... 192/64 |
| 6,290,044 B1 | * | 9/2001 | Burgman et al. ............. 192/46 |
| 6,505,721 B1 | * | 1/2003 | Welch .......................... 192/46 |
| 2002/0170796 A1 | * | 11/2002 | Fitz et al. ..................... 192/46 |

FOREIGN PATENT DOCUMENTS

| | | |
|---|---|---|
| DE | 675 985 C | 5/1939 |
| EP | 0 508 967 | 10/1992 |
| FR | 2 809 784 A | 12/2001 |
| WO | WO 94 05931 | 3/1994 |
| WO | WO 98 41779 A | 9/1998 |
| WO | WO 00 08357 A | 2/2000 |

* cited by examiner

*Primary Examiner*—Tisha Lewis
(74) *Attorney, Agent, or Firm*—Liniak, Berenato & White (57) ABSTRACT

A transmission between a gear (22) mounted freely to rotate about a shaft and a one-way drive-lock mechanism (26) for engaging in rotation the gear (22) and its shaft in a rotational direction, including a ring (52) integral in rotation with the shaft and bearing on its radial surface (54) at least two dogs (58) pivotally mounted about radial axes (62) between rest and locking positions on the gear (22) wherein they prevent the gear from rotation relative to the shaft. The invention is particularly applicable to transmission systems for a motor vehicle.

13 Claims, 8 Drawing Sheets

LOCKING DEVICE WITH TRANSMISSION GEARS

BACKGROUND OF THE INVENTION

1. Field of the Invention

This invention relates to transmission apparatus, in particular for a motor vehicle, of the type in which at least one pinion, mounted for free rotation on a shaft, is associated with controlled means for coupling the shaft and pinion for rotation together, the said means comprising at least one one-way locking mechanism mounted between the shaft and the pinion, together with means for actuating the said mechanism.

2. Description of Related Art

It has previously been proposed, in Applications FR 0 002 482 and FR 0 003 491 of the Applicant, to provide an automatic transmission of the gear type for a motor vehicle which comprises two clutches coupling the output shaft of an internal combustion engine with two input shafts of the transmission, driving pinions mounted on the said input shafts, driven pinions mounted on the output shaft of the transmission and in engagement with the driving pinions, and with them defining transmission ratios, one of the pinions of each ratio being coupled in rotation to its shaft while the other one is free to rotate on its shaft and is associated with control means for coupling it with the shaft, for engagement of the corresponding transmission ratio.

The coupling means associated with each free pinion comprise two one-way locking mechanisms which are mounted in opposite directions between the free pinion and its shaft, while actuating means of these mechanisms enable them to be selectively rendered active or inactive.

In one embodiment of such a transmission, the one-way locking mechanisms are arranged on the flanks of the free pinions, and comprise locking members such as catches, which are associated with return springs and with pushers for engaging on sets of teeth formed on the flanks of the free pinions, or to move away from these teeth. Cams, mounted for example inside the shaft and carrying the free pinions, are connected to an actuator through an axial rod and are able to act on the pushers so as to put the catches into engagement with the teeth on the flanks of the pinions.

BRIEF SUMMARY OF THE INVENTION

An object of the present invention is to improve transmissions of the above type so as, firstly, to enable their operation to be improved and improve their reliability, and secondly, to simplify their assembly while reducing their cost. It is also applicable to any apparatus for changing transmission ratios, whether automatic or otherwise, and whether having a simple or a double clutch.

To this end, it proposes transmission apparatus, in particular for a motor vehicle, comprising at least one pinion mounted for free rotation on a shaft, and controlled means for coupling the shaft and pinion for rotation together, the said means comprising two one-way locking mechanisms which are mounted between the shaft and the pinion to prevent rotation of the pinion with respect to the shaft in one direction and to permit such rotation in the other direction, and vice versa, characterised in that the said mechanisms comprise a sleeve mounted on the shaft adjacent to the pinion and coupled to the shaft for rotation therewith, at least two pallets mounted on a radial face of the sleeve for pivoting movement in opposite directions about substantially radial axes between a rest position and a locking position, means formed either on a radial face of the pinion adjacent to the said radial face of the sleeve, or on a separate attached member fixed with respect to the pinion, for abutting cooperation, in a first direction of rotation of the pinion with respect to the sleeve, with a first pallet when the latter is in its locking position, and, in the other direction of rotation of the pinion with respect to the sleeve, with a second pallet when the latter is in its locking position, first means for displacing the said first pallet between its locking and rest positions, and second means for displacing the said second pallet between its locking and rest positions, the first and second means being independent of each other and being able to displace the said first and second pallets simultaneously in their locking position.

Accordingly, these mechanisms are in the form of a sleeve which is mounted adjacent to the pinion on the said shaft, and which is coupled in rotation to the said shaft, for example in mating cooperation. Assembly is simple, because it is sufficient to locate the pinion and the sleeve side by side on the shaft. In addition, mounting of the pallets in radial pivoting movement makes them impervious to the effects of centrifugal force.

Independence of the displacement means for the first and second pallets between their rest and locking positions enables the pinion to be locked on the shaft in both directions of rotation and to be unlocked selectively in one and/or the other direction of rotation.

According to a further feature of the invention, an annular cover plate is fixed on the said radial face of the sleeve, and includes a window or cut-out in the region of each pallet and abutment means on a part of the pallets, these abutment means being adapted to define pivot axes for the pallets.

In addition, return springs, mounted between the pallets and the sleeve, constantly biases the pallet towards its locking position.

Where the cover plate is fixed on the sleeve, it enables the pivoting movement of the pallets to take place while preventing the latter and their return springs from escaping. The assembly of the sleeve, pallets, return springs and cover plate constitutes a module which can be assembled independently, and which has only then to be engaged on the shaft carrying the free pinion.

According to another feature of the invention, two members are mounted in rotation with respect to the sleeve, each said member including a finger co-operating with a pallet for displacing it from its locking position to its rest position.

Preferably, the said two members are rings which are axially superimposed between the sleeve and the cover plate.

They enable the pallets to be held in their rest position against the force exerted on the pallets by their return springs, so that the pinion is able to rotate freely on its shaft in either direction. Each ring may comprise a plurality of fingers co-operating with different pallets, which are spaced apart uniformly about the axis of rotation.

According to yet another feature of the invention, the said sleeve is mounted between two pinions which are free to rotate on the sleeve, and its two radial faces include said pallets for locking each of the pinions in at least one direction of rotation with respect to the shaft.

In another version, the sleeve includes such pallets on a single radial face, and is mounted axially between the pinion and an annular member which is fixed on the pinion and which participates in the guidance of the pinion in rotation on the shaft.

In one embodiment of the invention, the rings are displaced in rotation on the sleeve by radial pushers which are guided in displacement in the sleeve between a rest position and a working position, and by return springs which are mounted between the rings and engagement surfaces presented by the sleeve.

In particular, one pusher may be associated with each ring, to act on a lug fixed to the ring so as to cause it to rotate in one direction with respect to the sleeve, and a return spring which acts on the ring so as to rotate it in the other direction.

The pushers which act on the rings of the two one-way locking mechanisms of the pinion extend radially into openings in the sleeve and shaft, and means for radial displacement of the pushers are mounted within the shaft and are axially displaceable with respect to the shaft.

In a further version, at least one annular member external to the shaft surrounds the said sleeve and is fixed to the latter for rotation with it, the said annular member being movable axially with respect to the said sleeve and comprising ramps which cooperate with lugs radially outside the said rings, so as to displace them in rotation, means being provided for displacing the said annular member in axial translation on the said sleeve in one direction and in the other direction.

BRIEF DESCRIPTION OF THE DRAWINGS

The invention will be understood more clearly, and further features, details and advantages of it will appear more clearly, on a reading of the description which is given by way of example and with reference to the attached drawings, in which.

DETAILED DESCRIPTION OF THE PREFERRED EMBODIMENTS

Figure 1:
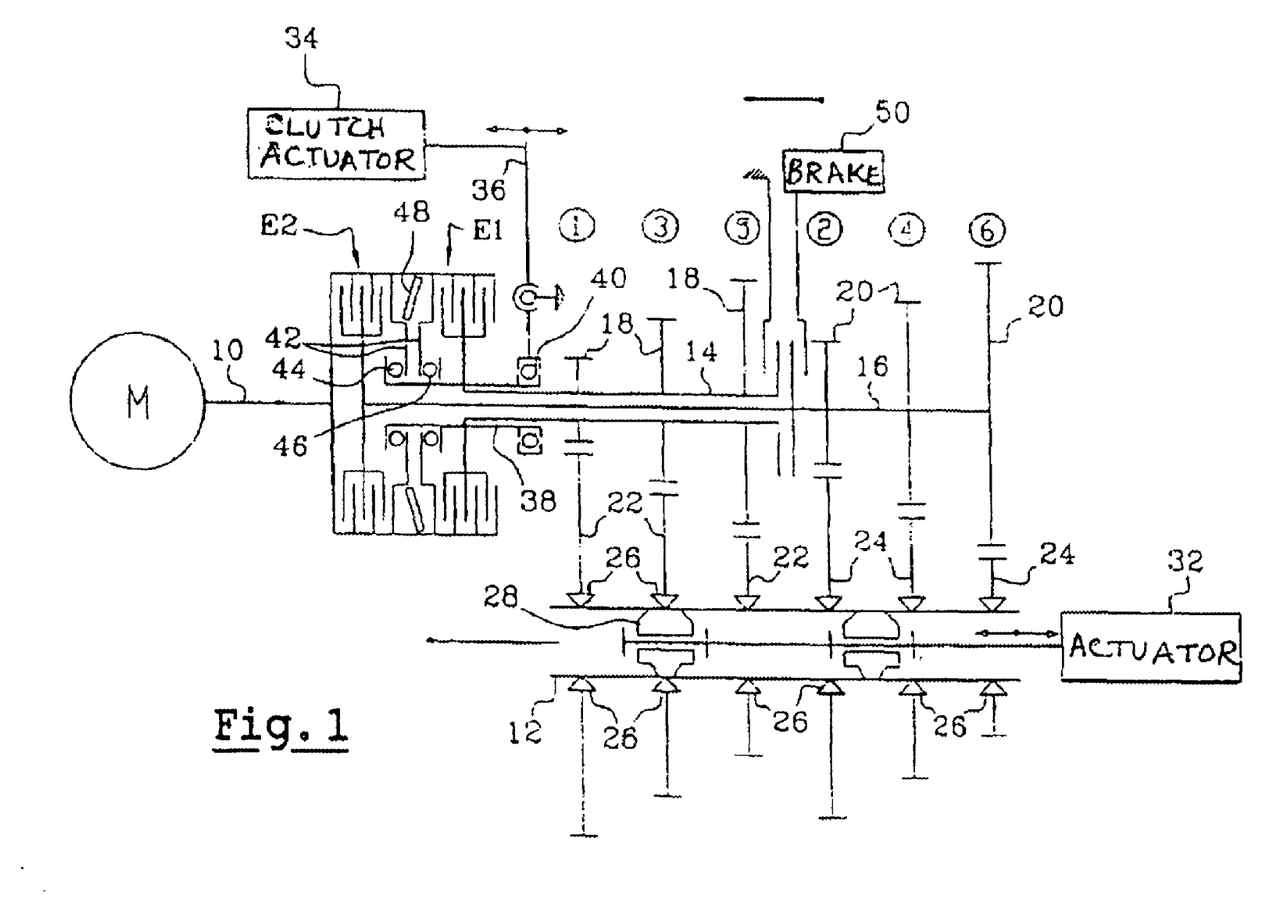
FIG. 1 is a diagrammatic representation of an automatic gear type transmission to which the invention is applicable.

Reference is first made to FIG. 1, which shows diagrammatically an automatic gear-type transmission for a motor vehicle, coupling the output shaft 10 of a heat engine M to a shaft 12 which is adapted to drive the road wheels of the vehicle in rotation through a differential.

The transmission comprises two input shafts 14, 16 which are coaxial, the shaft 16 extending within the shaft 14, these shafts being coupled to the output shaft 10 of the engine through respective clutches E1, E2.

Each input shaft 14, 16 carries driving pinions 18, 20 respectively which are coupled in rotation to their shaft, and each of which is in engagement with a respective driven pinion 22, 24, the meshed pairs of pinions 18, 22 and 20, 24 defining the transmission ratios numbered from first gear to sixth gear, the driving pinions of the first, third and fifth gears being on the first input shaft 14, and those for the second, fourth and sixth gears being on the second input shaft 16.

The driven pinions 22, 24 for the transmission ratios are free in rotation on the shaft 12, and are in association with means for selectively coupling with that shaft.

For each driving pinion, these coupling means comprise two controlled one-way locking mechanisms 26, which are mounted in opposite directions between the driven pinion and the shaft 12, and each of which is able to occupy a rest position and a working position, one of the said mechanisms preventing a driven pinion from turning with respect to the shaft 12 in a first direction and enabling it to rotate with respect to the shaft in the opposite direction, while the other locking mechanism permits rotation of the driven pinion with respect to the shaft 12 in the first direction while preventing such rotation in the opposite direction.

The actuating means for the one-way locking mechanisms 26 are in this example contained within the shaft 12 and comprise two cams 28, which are mounted on an axial rod 30 inside the shaft 12 and which are connected by means of the said rod to an actuator 32 controlled by control means of the transmission, which also control the clutches E1 and E2 and are connected to the control system of the engine for the purpose of exchanging information or for action. One of the cams 30 controls the one-way locking mechanisms 26 for the driven pinions of first, third and fifth gears, while the other cam 28 controls the mechanisms 26 for the driven shafts of the second, fourth and sixth gears. When a transmission ratio is engaged, the two locking mechanisms 26 of its driven pinion are in the working position, while the locking mechanisms 26 of the driven pinions of the other ratios are in the rest position.

To change gear, it is necessary to control two locking mechanisms of the driven pinion for the engaged gear ratio, and two locking mechanisms of the driven pinion for the new gear ratio, so as to put the first one in the rest position and the second one in the working position, and this is preferably achieved without interrupting the transmission of engine torque to the road wheels.

As described in the above mentioned prior Applications of the Applicant, the clutches E1 and E2 must be controlled in a predetermined sequence of operations in the course of which one of the driven shafts 14, 16 of the transmission can be temporarily braked.

Control of the clutches E1 and E2 may be obtained by means of a single actuator 34 which displaces, by means of a pivoting fork 36, a control shaft 36 which is coaxial with the first input shaft 14 of the transmission and coupled to the latter for rotation with it.

The fork 36 is connected to one end of the control shaft 38 through a rolling bearing 40, and the other end of the shaft 38 is connected to the pressure plates 42 of the clutches E1 and E2 through two further rolling bearings 44, 46 respectively.

The two clutches E1 and E2 are aligned and adjacent, and have substantially the same diameter, though they are oriented in opposite directions and their pressure plates 42 are close to each other and displaceable in opposite directions to obtain declutching. In this way, a common Belleville ring 48 may be mounted between the pressure plates so as to keep them in their gripping position when the actuator 34 is in its rest position, and so that it leaves the fork 36 and the control shaft 38 in the middle position shown in FIG. 1.

When the actuator 34 displaces the upper part of the fork 36 towards the right in FIG. 1, the clutch E1 is disengaged and the clutch E2 is held engaged. Conversely, when the actuator 34 displaces the upper end of the fork 36 towards the left in FIG. 1, it is the clutch E1 that is held engaged and the clutch E2 is opened.

The control shaft 38, which is coupled in rotation to the first input shaft 14 of the transmission, is not subjected to any rotational torque with respect to that shaft, and is therefore displaceable axially in translation without any difficulty, through apertures in the annular member which connects the shaft 14 to the friction discs of the clutch E1.

It will also be noted that a common brake mechanism 50 acts on the two input shafts 14 and 16 simultaneously when the rotational velocity of one of the shafts has to be reduced. It is of course the input shaft in which the clutch E1 or E2 is disengaged which will see its rotational velocity reduced when the brake mechanism 50 is actuated, the braking torque applied to the input shafts being very much smaller than the rotational torque provided by the engine M, and being just large enough to brake the shaft 14 or 16, which is free to rotate.

Figure 2:
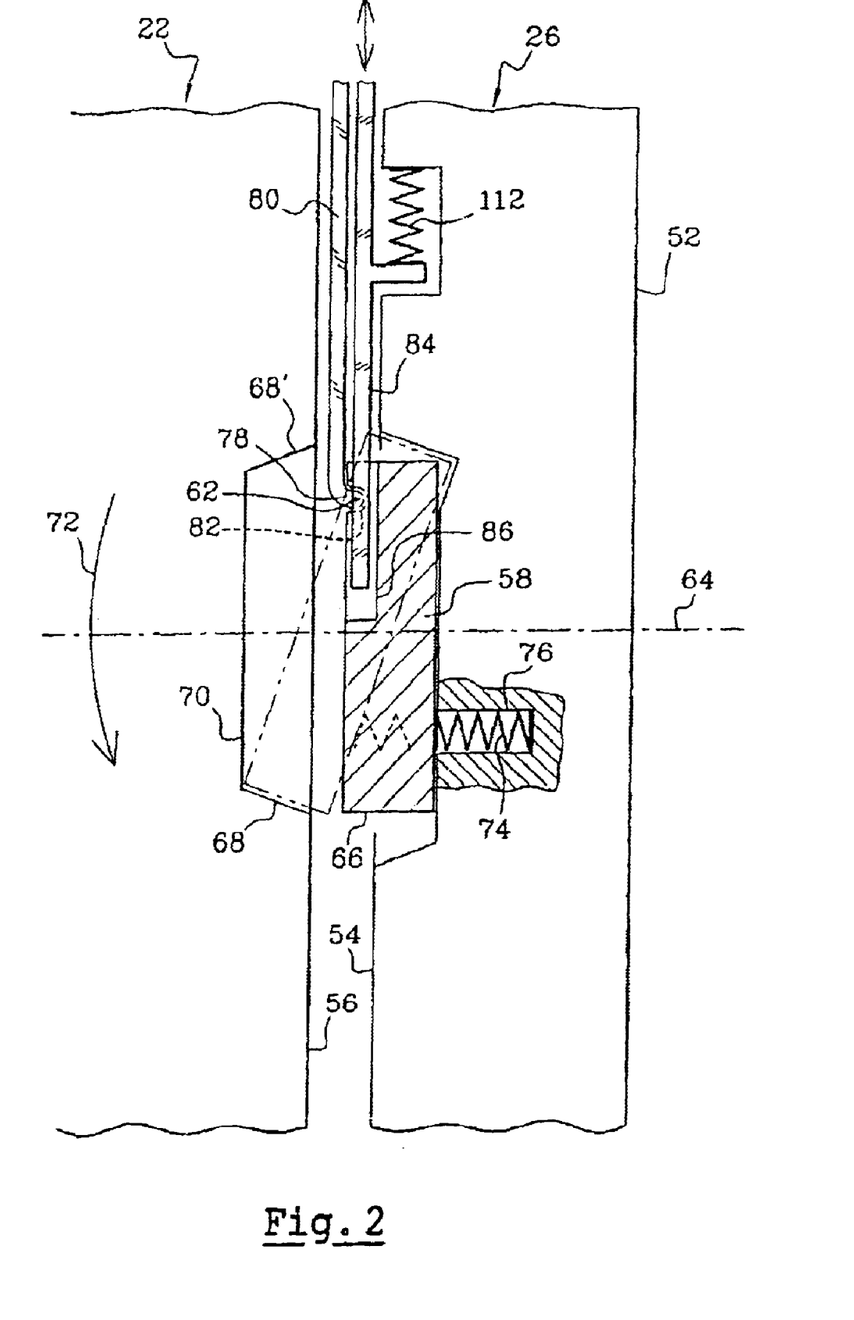
FIG. 2 shows diagrammatically the principle of one-way locking of a pinion, in accordance with the invention.

FIG. 2 shows the principle of a one-way locking mechanism 26 associated with a driven pinion 22 or 24 for coupling it selectively with its shaft 12 for a given direction of rotation.

This mechanism 26 associated with the driven pinion, for example 22, is coaxial with the pinion and essentially comprises a sleeve 52 which is coupled to the shaft 12 for rotation with the latter, and which carries, on its radial face 54 situated facing a corresponding radial face 56 of the pinion 22, a pallet 58 which is mounted in a cavity 60 in the radial face 54, and which is pivotable about a pivot pin 62 which is substantially radial with respect to the axis of rotation 64 of the sleeve 52 and pinion 22, between a position shown in full lines in FIG. 2 and a position which is a locking position and which is shown in phantom lines.

In the latter position, the end 66 of the pallet opposite to the pivot pin 62 is in abutment on one end 68 of a cavity 70 formed in the radial face 56 of the pinion 22. In this position of the pallet 58, the pinion 22 is able to rotate about the axis 64 with respect to the sleeve 52 in the direction indicated by the arrow 72, but cannot turn with respect to the sleeve 52 in the opposite direction.

The pallet 58 is biased constantly towards its locking position by a return spring 74 which is mounted in a blind hole 76 formed in the base of the cavity 60, parallel to the axis of rotation 64.

As can also be seen in the description that follows, the pivot pin 62 of the pallets 58 consists of one or more fingers 78 of a cover plate 80 which at least partially overlies the radial face 54 of the sleeve 52 and is fixed on this sleeve, the finger or fingers 78 of the cover plate being engaged in holes or in a radial slot 82 in the free face of the pallet 58, at a distance from the return spring 74.

A moving element 84 is guided in displacement between the radial face 54 of the sleeve 52 and the cover plate 80, as indicated by the double arrow, so as to engage in a groove 86 in the free face of the pallet 58, to return the latter to its rest position by compressing the spring 74 as shown in FIG. 2. This moving element 84 is biased by a return spring towards its position of engagement on the pallet 58, and is displaceable, in a release position of the pallet, by an actuating member such as a pusher or an external sleeve, as will be described in detail later herein.

The other one-way locking mechanism 26, associated with the pinion 22 for coupling it with its shaft in the direction of rotation indicated by the arrow 72, is formed on the same sleeve 52 by and consists of at least one further pallet 58 which is mounted the other way round from that shown in FIG. 2, that is to say the positions of the pivot pin and return spring of this further pallet are reversed with respect to the positions shown in FIG. 2, and the free end 66 of the said further pallet is able to come into abutment on the other end 68' of the cavity 70 in the pinion in the locking position.

The two one-way locking mechanisms 26 associated with the driving pinion 22 are thus mounted on the same radial face of the sleeve 52.

Each of these mechanisms can of course have a plurality of pallets 58, spaced regularly apart about the axis of rotation 64, and the radial face 56 of the driven pinion may have a plurality of cavities 70, spaced apart uniformly on a common pitch circle about the axis 64. The pallets 58 of the two one-way locking mechanisms are preferably on a common pitch circle, and the cavities 70 adapted to receive them in the locking position are also on a common pitch circle centred on the axis 64.

In another version, the cavities 70 are formed in a separate attached component which is fixed to the pinion 22.

One of the advantages of these mechanisms is that the displacements of the pallets 58 between their rest position and their locking position takes place parallel to the axis of rotation 64, so that they are in consequence not sensitive to centrifugal forces.

Another advantage of the one-way locking mechanisms according to the invention is that they are very compact in the axial direction.

In addition, since the two one-way locking mechanisms of a pinion are on the same radial face 54 of the sleeve 52, the other radial face of this sleeve can receive the two one-way locking mechanisms of a pinion which is disposed facing the said other radial face. In this way, a sleeve 52 mounted between two pinions may carry all four one-way locking mechanisms associated with these pinions, which is of great advantage in terms of axial size.

A further advantage of the mechanisms according to the invention is their great simplicity and ease of assembly and fitting.

One particular embodiment of these mechanisms and their control means will now be described with reference to FIGS. 3 to 6.

Figure 3:
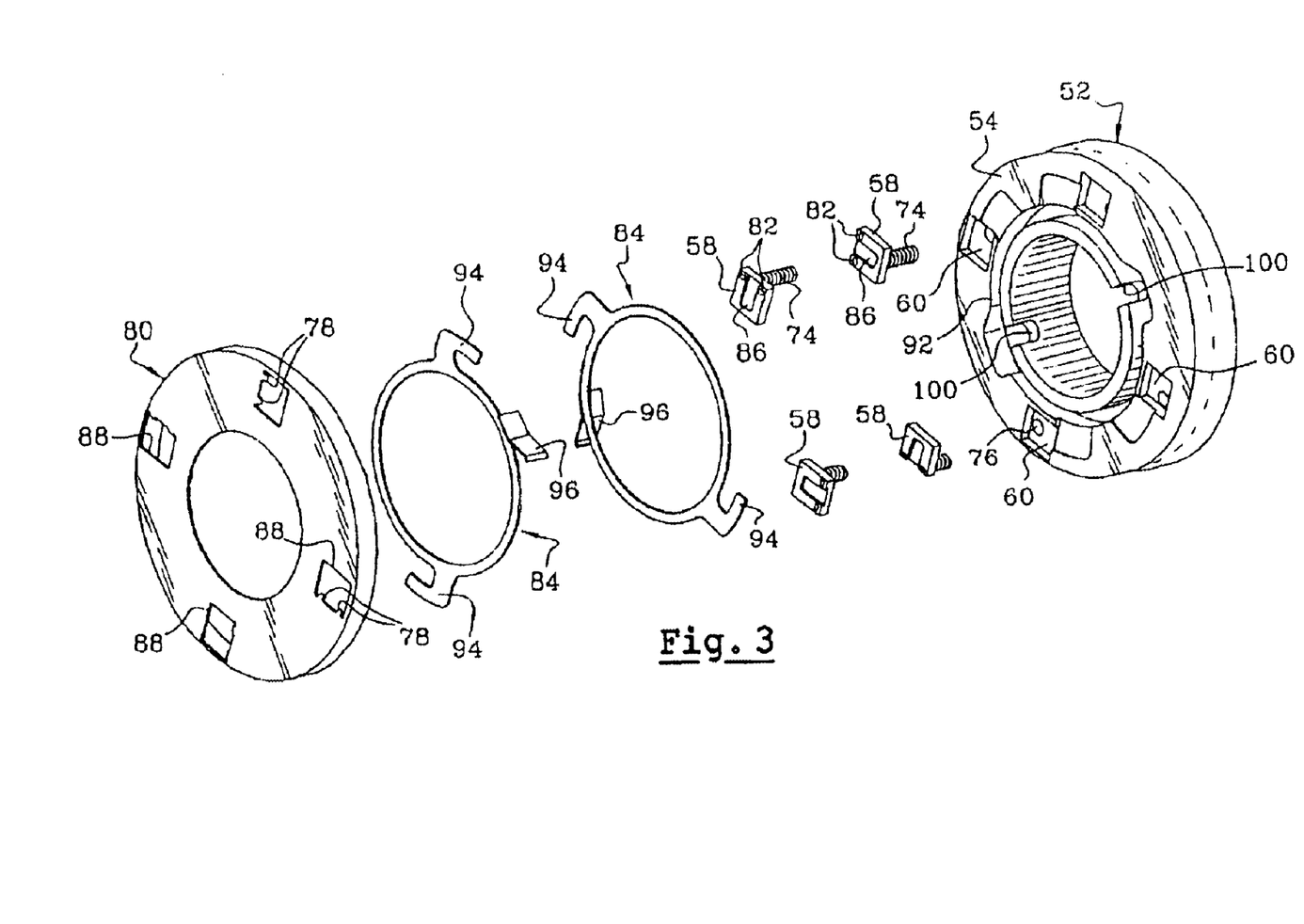
FIG. 3 is a diagrammatic exploded perspective view of a set of two one-way locking mechanisms according to the invention.

FIG. 3 shows the sleeve 52, the radial face 54 of which has four cavities 60, each of which is arranged to receive one pallet 58, with two of these pallets diametrically opposed so as to constitute a one-way locking mechanism for a pinion in one direction of rotation, while the other two diametrically opposed pallets constitute the other one-way locking mechanism for the pinion in the other direction of rotation.

The cover plate 80, which is arranged to overlie the radial face 54 of the sleeve 52, has four apertures or windows 88 for the passage of the pallets 58 lodged in the said cavities 60 in the sleeve 52. A radial edge of each window 88 includes two fingers 78 bent back at 90° inwardly and parallel to the axis of rotation, these fingers being adapted to be engaged in two corresponding cavities 82 in a pallet 58 so as to retain the pallet 58 in the corresponding cavity 60 of the sleeve 52 and, if appropriate, to define the pivot axis 62 of that pallet, though this axis may equally well be defined by other means.

The above mentioned moving elements which enable the pallets 58 to be put in their rest position are constituted by two flat annular rings 84 which are mounted between the radial face 54 of the sleeve 52 and the cover plate 80. In this embodiment, the two rings 84 are superimposed axially, and are mounted within a groove 92 of corresponding form which is formed in the radial face 54 of the sleeve 52.

Each ring 84 has two diametrically opposed fingers 94 which extend circumferentially and which are adapted to engage in the grooves 86 in the pallets 58 so as to put them in their rest position.

Each ring 84 also includes at least one lug 96 which extends obliquely outwards from the ring, and which is adapted to cooperate with a radial pusher 98 for rotating the ring 84 through a relatively small angle with respect to the axis of rotation.

It will be noted that the two rings 84 are symmetrical and are mounted in opposition to each other in the groove 92 in the radial face 54 of the sleeve 52.

Figure 4:
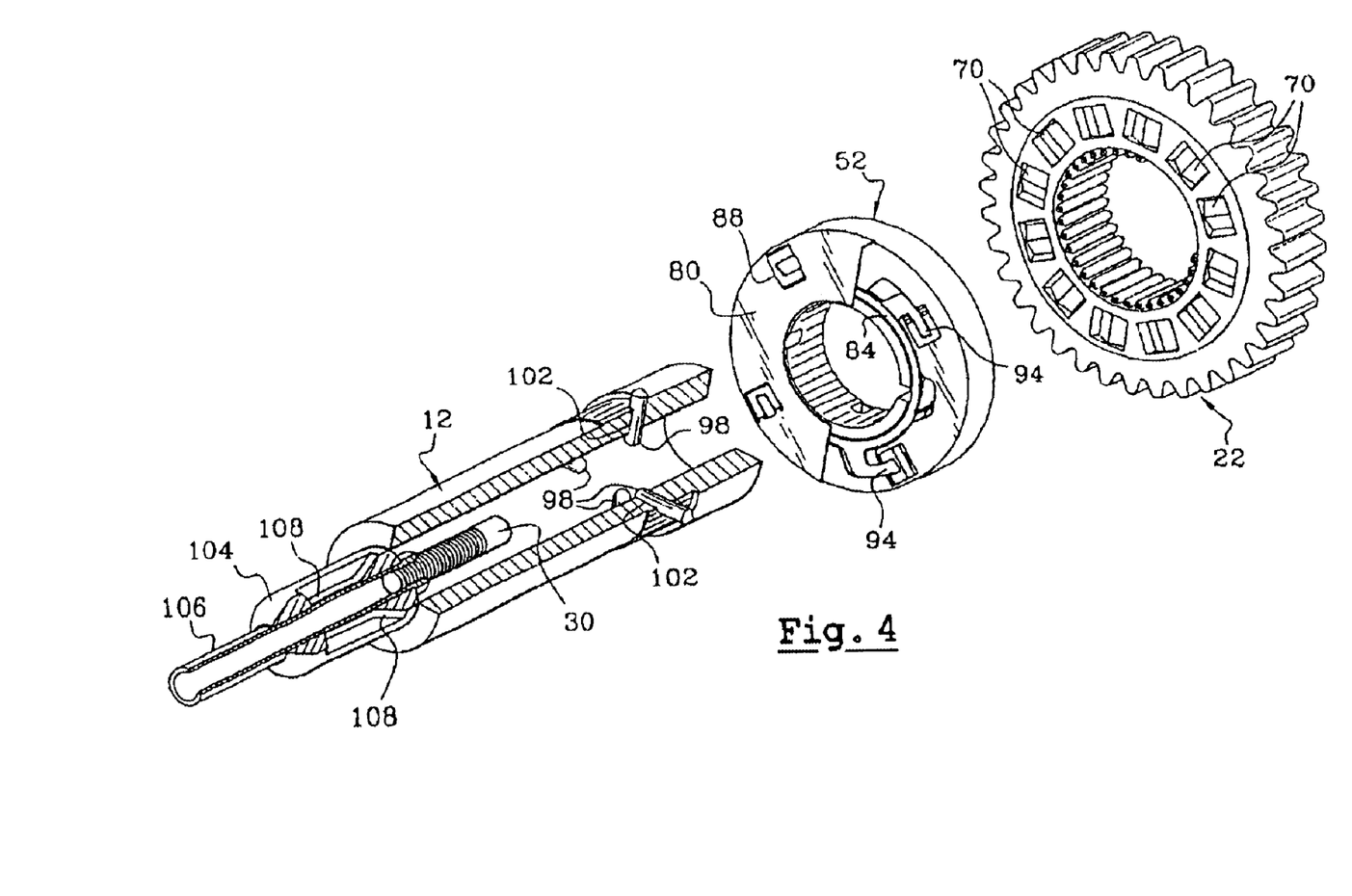
FIG. 4 is an exploded perspective view, shown partly cut away and representing a pinion, its one-way locking means and its rotary shaft.
Figure 5:
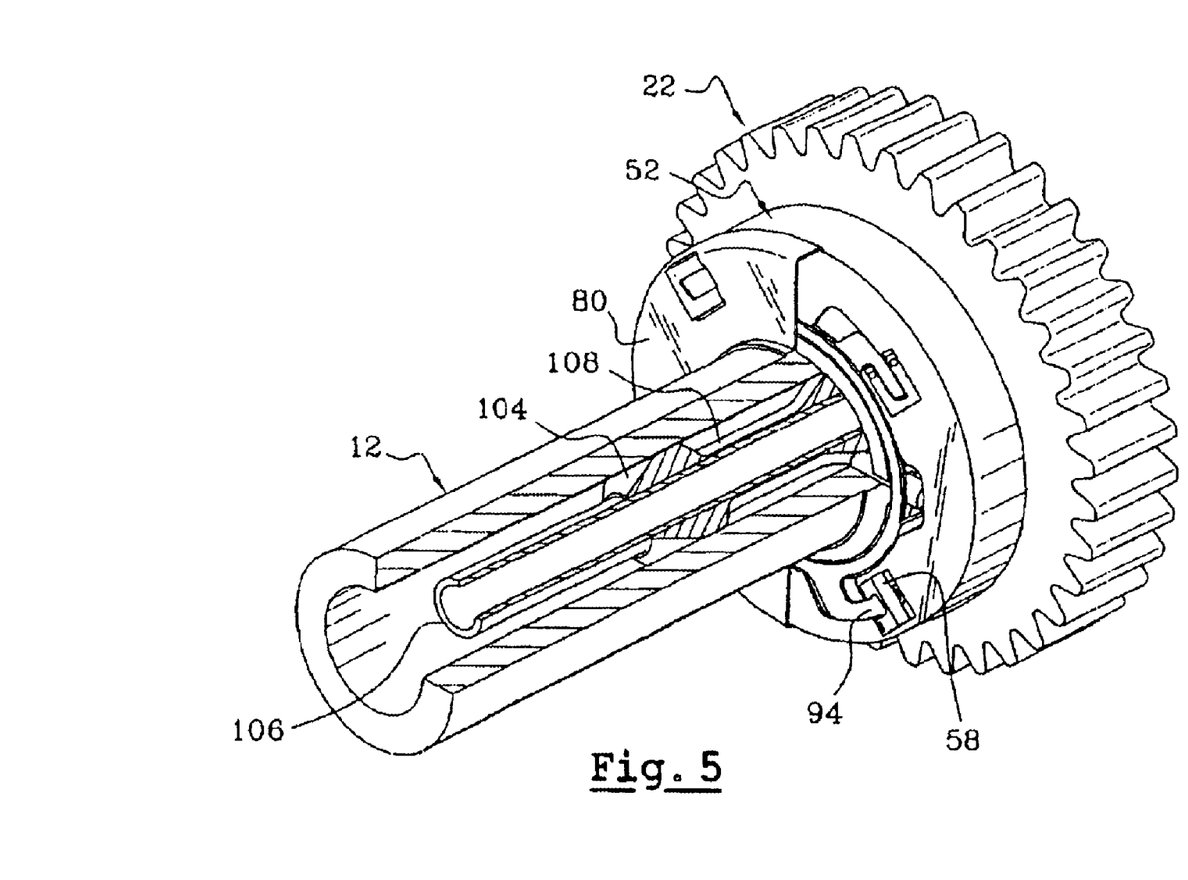
FIG. 5 is a perspective view corresponding to FIG. 4 but showing the pinion and its locking means mounted on the rotary shaft.
Figure 6:
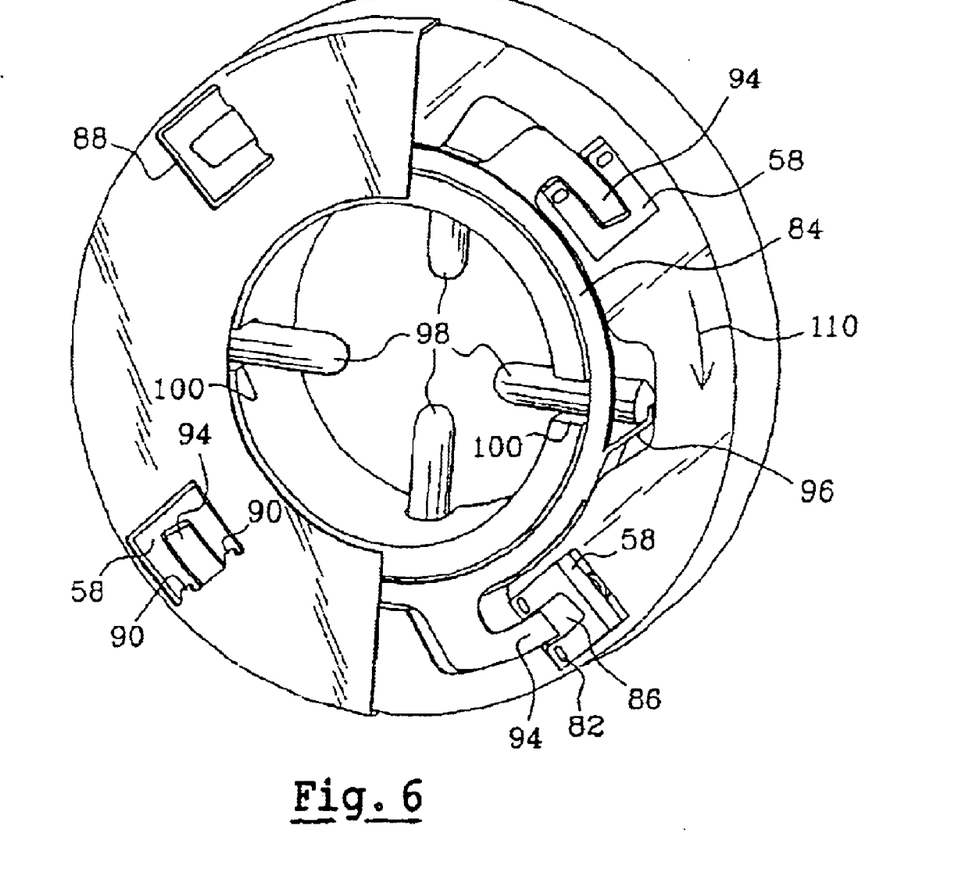
FIG. 6 is a perspective view of the whole of the locking means, shown on a larger scale.

The pushers 98 for actuating the two said rings 84 extend radially, firstly in slots 100 in the inner cylindrical surface of the sleeve 52, which are open into the above mentioned groove 92, and secondly in radial through holes 102 in the tubular shaft 12 as can be seen in FIG. 4.

The two pushers 98 are diametrically opposed and situated in a common transverse plane with respect to the axis of rotation. Two further radial pushers 98, diametrically opposed to each other and extending at right angles to the above mentioned pushers 98, are offset axially with respect to the latter and are arranged to actuate one-way locking mechanisms mounted on the other radial face of the sleeve 52.

Preferably, the slots 100 formed in the inner cylindrical surface of the sleeve 52 have a certain axial dimension which is such as to facilitate fitting and which takes manufacturing tolerances into account, and they may be open in the radial face 54 of the sleeve as shown in the drawings. Where the sleeve 52 carries two one-way locking mechanisms, two diametrically opposed slots 100 are open in a radial face of the said sleeve, and the other two diametrically opposed slots 100 are open in the other radial face of the sleeve.

The pushers 98 are actuated by a cam 104 of generally cylindrical form which is displaceable axially inside the shaft 12, and which is mounted so as to be freely rotatable on an axial tube 106, one end of which is connected through an axial rod 30 to the actuator 32 shown diagrammatically in FIG. 1.

In this embodiment, the cam 104 rotates with the shaft 12, and the tube 106 is fixed against rotation.

The radially inner ends of the pushers 98 are in engagement on longitudinal ramps 108 of the cam 104, so that the pushers 98 are displaced radially in one direction or the other when the cam 104 is displaced axially in one direction or the other within the shaft 12.

Radial outward displacement of the pusher 98 causes the ring 84, the lug 96 of which is in contact with the radially outer end of the pusher 98, to undergo limited rotation. The direction of rotation of the ring 84 is indicated by an arrow 110 in FIG. 6. This rotation withdraws the two fingers 94 of the ring 84 from the grooves 86 in the pallets 58, which can then be returned to the locking position by their return springs 74.

When the axial displacement of the cam 104 in the shaft 12 enables the pushers 98 to be displaced radially inwards, return means associated with the rings 84 cause the latter to rotate in the direction in which their fingers 94 are engaged in the grooves 86 of the pallets 58, so returning the latter to their rest position. These return means consist for example of springs such as those shown at 112 in FIG. 2, or resiliently deformable tongues which extend in the groove 92 and are constituted for example on the annular cover plate 80.

The operation of the locking mechanism corresponds to that already described in the above mentioned prior art patent applications of the Applicant. Each of the two locking mechanisms associated with a pinion is actuated by one pusher 98. When the two pushers are in a radially inner position, the two locking mechanisms are out of use and the pinion is free to rotate on the shaft 12. When one of the pushers 98 is displaced radially outwards by the cam 104, the corresponding locking mechanism is brought into use and the pinion is able to rotate with respect to the shaft 12 in only one direction of rotation. When both pushers 98 have been displaced radially outwards by the cam 104, both locking mechanisms are in use and the pinion is coupled in rotation with the shaft 12.

The sleeve 52 carrying the locking mechanisms is mounted so as to be rotatable with the sleeve 12, by any appropriate means. For example, longitudinal splines are formed on the inner cylindrical face of the sleeve 52 and cooperate with corresponding longitudinal splines formed on the shaft 12.

The axial position of the sleeve 52 on the shaft 12 is preferably determined by a shoulder on the outer cylindrical surface of that shaft.

The axial clearance between the pinion 22 and the sleeve 52 is small (typically a few tens of millimetres).

Fitting and assembly of the one-way locking mechanisms according to the invention is extremely simple:

The pallets 58 are first positioned in the cavities 60 in the sleeve, their return springs 74 being introduced into the holes 76, and the rings 84 are then put in place and the annular cover plate 80 is positioned on the corresponding face of the sleeve 52 and fixed to the latter by any appropriate means, for example by seaming or the like.

For fitting them on the shaft 12, the pinions 22, 24 and the sleeves 52 are threaded alternately on the shaft 12, the pushers 98 being entirely within the shaft 12 as shown in FIG. 4.

The cam 104 is then displaced within the shaft 12. The frusto-conical end of the cam 104 displaces the pushers 98 radially outwards, after which the latter descend once again on the ramps 108. It will be noted that the pushers 98 in radial engagement on the ramps 108 of the cam 104 enable the cam 104 to be coupled in rotation with the shaft 12.

Figure 7:
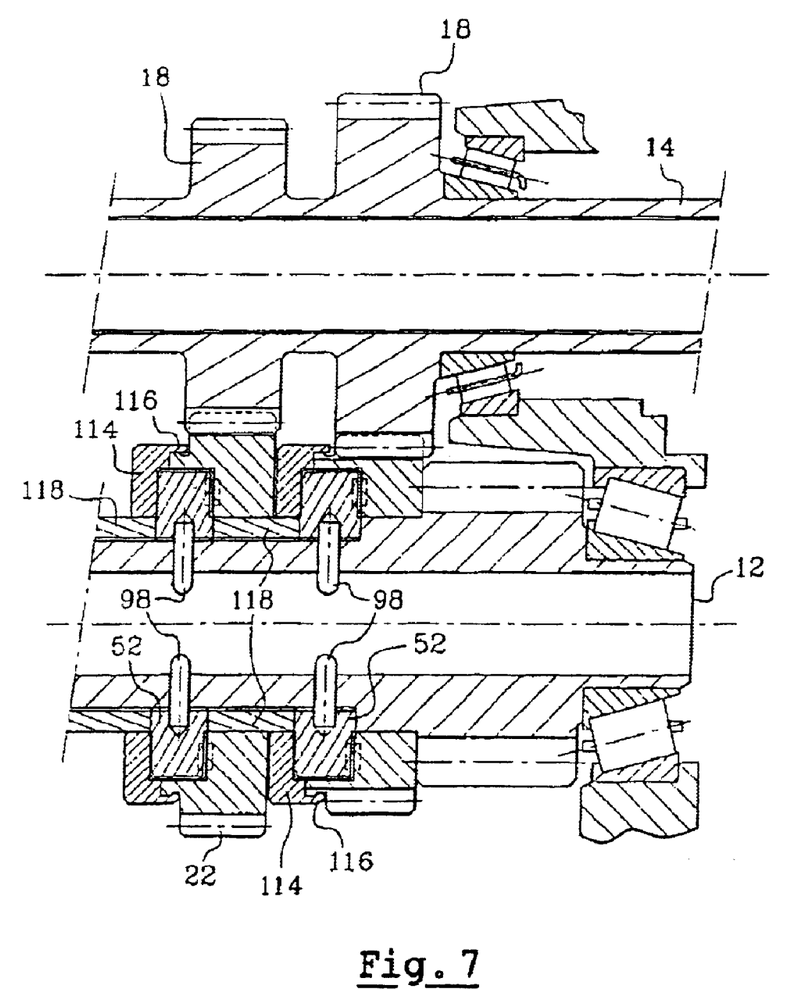
FIG. 7 is a partial diagrammatic view in axial cross section of a modified version of the invention.

In another version, and as shown in FIG. 7, each sleeve 52 includes two one-way locking mechanisms working in opposite directions on only one of the radial faces, and is associated with a single driven pinion 22 or 24. In this case, the sleeve 52 is mounted between the pinion 22 or 24 and an annular member 114, which has an axial flange 116 for fastening it to the pinion and which plays a part in guiding the rotation of the latter on the shaft 12. Spacing sleeves 118 are mounted on the shaft 12 between the sleeves 52, and support the driven pinions 22 or 24 and the members 114.

Figure 8:
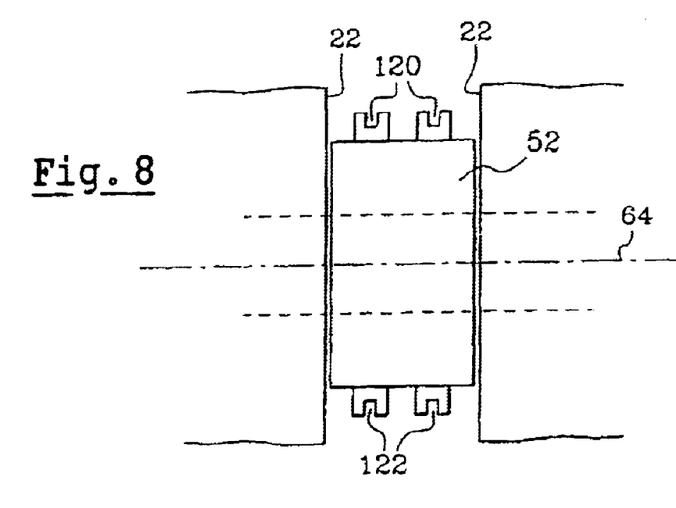
FIGS. 8 and 9 show diagrammatically a further modified version of the invention, with FIG. 9 being a developed partial view of an annular member seen in FIG. 8.
Figure 9:
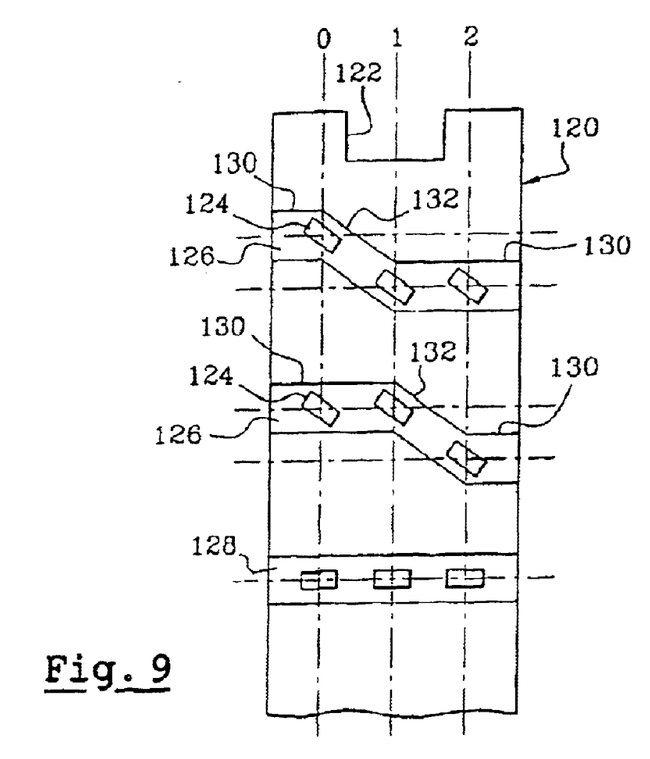

In another embodiment which is shown in FIGS. 8 and 9, the actuating means of the one-way locking mechanisms are not mounted within the shaft 12 but are arranged around the said sleeves 52. In the example in FIGS. 8 and 9, each sleeve 52 mounted on the shaft 12 between two driven pinions 22 or 24 carries two one-way locking mechanisms on each of its radial faces, and is surrounded by two annular members 120 which are arranged to control the locking mechanisms, each annular member being coupled to the sleeve 52 for rotation with the latter and being displaceable axially in translation on the latter, for example by means of a fork (not shown) engaged in a peripheral groove or slot 122 in the corresponding annular member 120.

The one-way locking mechanisms have a structure similar to that shown in FIG. 3, but the rings 84 are formed, in place of the lugs 96 co-operating with the pushers 98, with lugs which are oriented radially outwards and which are designated by the references 124 in FIG. 9 (which is a partial developed view of an annular member 120), and the ends of which are guided in grooves 126 formed in the inner cylindrical surfaces of the annular members 120, these grooves being oriented generally partly parallel to the axis of rotation 64.

As shown in FIG. 9, an additional groove 128 parallel to the axis may be formed in the inner cylindrical surface of each annular member 120, for the purpose of receiving a projecting element formed on a corresponding surface of the sleeve 52, which enables the member 120 and sleeve 52 to be coupled together in rotation while enabling the member 120 to be displaced axially around the sleeve 52.

Each groove 126 receiving the end of a radial lug 124 of a sleeve 84 comprises two portions 130 parallel to the axis and joined together by a portion 132 which is oblique with respect to the axis, the oblique portions 132 of the two grooves 126 being offset axially with respect to each other.

Under these conditions, when an annular member 120 is displaced by axial translation on the sleeve 52 between the three positions indicated at 0, 1 and 2 in FIG. 9, the rings 84 are displaced in rotation about the axis 64 in the following way:

when the sleeve 52 passes in relation to the members 120 from position 0 to position 1, a first lug 124 (the topmost one in FIG. 9) is displaced angularly about the axis of rotation, while the other lug 124 keeps its angular position;

when the sleeve 52 is displaced in relation to the annular member 120 from position 1 to position 2, the lug 124 of the first ring 84 keeps its angular position while the lug 124 of the other ring 84 is displaced angularly about the axis 64.

Thus, when the annular member 122 is displaced between positions 0 and 2, the two one-way locking mechanisms associated with a driven pinion change state, the pinion being free to rotate on the shaft 12 if it was previously coupled in rotation to that shaft and vice versa.

The two annular members 120 may be displaceable axially on the sleeve 52 by translation through two steps in the same direction between position 0 and position 2 and vice versa, or, alternatively, the two members 120 may be displaceable in one step on either side from the middle position 1.

What is claimed is:

1. Transmission apparatus, in particular for a motor vehicle, comprising at least one pinion (22) mounted for free rotation on a shaft (12), and controlled means (26) for coupling the shaft and pinion for rotation together, the means comprising two one-way locking mechanisms (26) which are mounted between the shaft and the pinion to prevent rotation of the pinion with respect to the shaft in one direction and to permit such rotation in the other direction, and vice versa, characterized in that said mechanisms comprise a sleeve (52) mounted on the shaft (12) adjacent to the pinion (22) and coupled to the shaft for rotation therewith, at least two pallets (58) mounted on a radial face (54) of the sleeve for pivoting movement in opposite directions about substantially radial axes between a rest position and a locking position, means (70) formed either on a radial face of the pinion (22) adjacent to the radial face of the sleeve, or on a separate attached member fixed with respect to the pinion, for abutting cooperation, in a first direction of rotation of the pinion with respect to the sleeve, with a first pallet (58) when the first pallet is in its locking position, and, in the other direction of rotation of the pinion with respect to the sleeve, with a second pallet (58) when the second pallet is in its locking position, first means (84) for displacing the first pallet (58) between its locking and rest positions, and second means (84) for displacing the second pallet (58) between its locking and rest positions, the first and second means being independent of each other and being able to displace the first and second pallets simultaneously in their locking position.

2. Apparatus according to claim 1, characterized in that an annular cover plate (80) is fixed on the sleeve and overlies at least part of the radial face (54) of the sleeve, and comprises a window (88) in the region of each pallet (58), together with means (78) for abutment on part of each pallet.

3. Apparatus according to claim 1, characterized in that a return spring (74), mounted between each pallet (58) and the sleeve (52), constantly biases the pallet towards its locking position.

4. Apparatus according to claim 2, characterized in that the means (84) for displacing the pallets (58) are mounted in rotation with respect to the sleeve (52), each of the means (84) including a finger (94) co-operating with a corresponding pallet (58) for displacing it from its locking position to its rest position.

5. Apparatus according to claim 4, characterized in that the means (84) for displacing the pallets (58) are rings (84) which are axially superimposed between the sleeve (52) and the cover plate (80).

6. Apparatus according to claim 4, characterized in that the sleeve (52) carries a plurality of first and second pallets (58), spaced apart uniformly about the axis of rotation.

7. Apparatus according to claim 6, characterized in that all of the first pallets (58) are displaceable from their locking position to their rest position by a first ring (84), and all of the second pallets are displaceable from their locking position to their rest position by a second ring (84).

8. Apparatus according to claim 1, characterized in that the sleeve (52) is mounted between two pinions which are free to rotate on the shaft (12), and its two radial faces (54) include the pallets (58) for locking each of the pinions in at least one direction of rotation with respect to the shaft.

9. Apparatus according to claim 8, characterized in that the sleeve (52) comprises pallets (58) on a single radial face (54), and is mounted axially between the pinion (22) and an annular member which is fixed on the pinion and which participates in the guidance of the pinion in rotation on the shaft (12).

10. Apparatus according to claim 1, characterized in that the means (84) for displacing the pallets (58) are actuated by at least two pushers (98), which are guided in radial openings (100, 102) in the sleeve (52) and shaft (12), and which are displaced radially by cams (104) displaceable axially within the shaft (12).

11. Apparatus according to claim 10, characterized in that the two pushers (98) are substantially in a common transverse plane with respect to the axis of rotation.

12. Apparatus according to claim 10, characterized in that the cams (104) are in cooperation through ramps (108) with the ends of the pushers (98) and are mounted on a tube (106) which is connected by means of an axial rod (30) to actuating means (32).

13. Apparatus according to claim 1, characterized in that the means (84) for displacing the pallets (58) are actuated by at least one annular member (120) surrounding the sleeve (52) and coupled to the sleeve for rotation therewith, the annular member being movable axially with respect to the sleeve and comprising oblique ramps (132) in cooperation with radially external lugs (124) of the displacement means (84), and means for effecting axial translation of the annular member (120) on the sleeve (52) in either direction.

* * * * *